United States Patent

Chiao et al.

[11] Patent Number: 6,155,980
[45] Date of Patent: Dec. 5, 2000

[54] ULTRASONIC IMAGING SYSTEM WITH BEAMFORMING USING UNIPOLAR OR BIPOLAR CODED EXCITATION

[75] Inventors: Richard Yung Chiao, Clifton Park, N.Y.; Lewis Jones Thomas, III, Palo Alto, Calif.

[73] Assignee: General Electric Company, Schenectady, N.Y.

[21] Appl. No.: 09/268,306

[22] Filed: Mar. 16, 1999

[51] Int. Cl.[7] .................................................... A61B 8/00
[52] U.S. Cl. .............................................................. 600/447
[58] Field of Search .................................... 600/443, 447, 600/453, 455, 458; 128/916

[56] References Cited

U.S. PATENT DOCUMENTS

| 5,329,929 | 7/1994 | Sato et al. ................................ 600/441 |
| 5,632,277 | 5/1997 | Chapman et al. .................. 129/660.07 |
| 5,706,819 | 1/1998 | Hwang et al. ...................... 128/662.02 |
| 5,833,613 | 11/1998 | Averkiou et al. ........................ 600/440 |
| 5,934,288 | 8/1999 | Avila et al. ............................... 128/916 |
| 5,938,611 | 8/1999 | Muzilla et al. ........................... 600/455 |
| 5,961,463 | 10/1999 | Rhyne et al. ............................. 600/458 |
| 5,964,706 | 10/1999 | Mo et al. ................................. 600/443 |
| 5,980,459 | 11/1999 | Chiao et al. ............................. 600/447 |
| 5,984,869 | 11/1999 | Chiao et al. ............................. 600/437 |
| 6,030,344 | 2/2000 | Guracar et al. .......................... 600/447 |
| 6,042,545 | 3/2000 | Hossack et al. ......................... 600/443 |

OTHER PUBLICATIONS

Sischka et al., "Complementary Correlation Optical Time–Domain Reflectometry," Hewlett–Packard Journal, Dec. 1988, pp. 14–21.

*Primary Examiner*—Marvin M. Lateef
*Assistant Examiner*—Ali M. Imam
*Attorney, Agent, or Firm*—Marvin Snyder; Douglas E. Stoner

[57] ABSTRACT

Coded excitation for medical ultrasound imaging is implemented by transmitting code or element symbols in the encoded base sequence on different firings. The encoded base sequence is formed by convolving a base sequence with an oversampled code sequence. For each firing the designated code or element symbol in the encoded base sequence is replaced by a unit symbol (i.e., 1 or −1) while the other symbol locations are all set to zero. After each transmit, the received waveform is multiplied by the respective symbols and accumulated to synthesize the received encoded waveform.

25 Claims, 7 Drawing Sheets

ULTRASONIC IMAGING SYSTEM WITH BEAMFORMING USING UNIPOLAR OR BIPOLAR CODED EXCITATION

FIELD OF THE INVENTION

This invention relates to ultrasound imaging systems and, in particular, to methods and apparatus for increasing the signal-to-noise ratio (SNR) in medical ultrasound imaging.

BACKGROUND OF THE INVENTION

A conventional ultrasound imaging system comprises an array of ultrasonic transducer elements which transmit an ultrasound beam and receive the reflected beam from the object being studied. Specifically, a series of measurements is performed in which a focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next. The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delays (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. Resolution of a scan line is a result of the directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

In medical ultrasound imaging systems of the type described hereinabove, it is desirable to optimize the SNR. Additional SNR can be used to obtain increased penetration at a given imaging frequency or to improve resolution by facilitating ultrasonic imaging at a higher frequency.

The use of Golay codes in ultrasound is well known in the area of non-destructive evaluation (NDE) using single-element fixed-focus transducers to inspect inanimate objects. Golay codes are also known in the medical ultrasound imaging community. However, Golay codes have not commonly been used in ultrasound imaging systems because dynamic focusing, tissue motion (effects not present in NDE) and nonlinear propagation effects were thought to cause unacceptable code degradation with corresponding range degradation.

U.S. patent application Ser. No. 09/063,109, filed Apr. 20, 1998 and assigned to the instant assignee, discloses a method and an apparatus for improving the SNR in medical ultrasound imaging by using Golay-encoded excitation of the transducer array. The SNR is improved by transmitting a pair of Golay-encoded base sequences consecutively on each beam at the same focal position and then decoding the beamsummed data. A pair of Golay-encoded base sequences are formed by convolving a base sequence with a Golay code pair after oversampling. A Golay code pair is a pair of binary (+1, −1) sequences with the property that the sum of the autocorrelations of the two sequences is a Kronecker delta function. An oversampled Golay sequence is the Golay sequence with zeroes between each +1 and −1, the number of zeroes being greater than or equal to one less than the length of the base sequence. The aforementioned property of Golay code pairs translates into two important advantages over codes in general: (1) Golay codes have no range sidelobes, and (2) Golay codes can be transmitted using only a bipolar pulser versus a more expensive digital-to-analog converter.

In practice, images produced using coded excitation can be degraded by code distortion. Bipolar codes degrade when the signal representing the positive code symbol no longer cancels out with the signal representing the negative code symbol after nonlinear propagation. There is need for a method to reduce code degradation due to nonlinear propagation and to implement coded excitation on systems which have only unipolar pulsers.

SUMMARY OF THE INVENTION

Coded excitation for medical ultrasound imaging is implemented by transmitting different code or element symbols in an encoded base sequence on different firings. The encoded base sequence is formed by convolving a base sequence with an oversampled code sequence. For each firing the designated code or element symbol in the encoded base sequence is replaced by a unit symbol (e.g., 1 or −10 ) while the other symbol locations are all set to zero. After each transmit, the received waveform is multiplied by the respective symbols and accumulated over all transmits to synthesize the received encoded waveform. This technique of synthesizing a bipolar (in general polyphase) code from unipolar coded transmits is useful for reducing code degradation due to nonlinear propagation and for implementing coded excitation on systems which have only unipolar pursers. The tradeoff for this technique is reduced frame rate, since two unipolar transmit firings are needed for each bipolar firing. The method of the invention can be extended to polyphase codes, single-transmit codes (e.g., Barker codes) and spatially encoded transmits.

As used herein, the term "transmit sequence" refers to a sequence of unit code or element symbols supplied to the pulsers, whereas the term "pulse sequence" refers to a sequence of pulses provided by the pulsers in response to receipt of a transmit sequence.

DETAILED DESCRIPTION OF THE PREFERRED EMBODIMENTS

Figure 1:
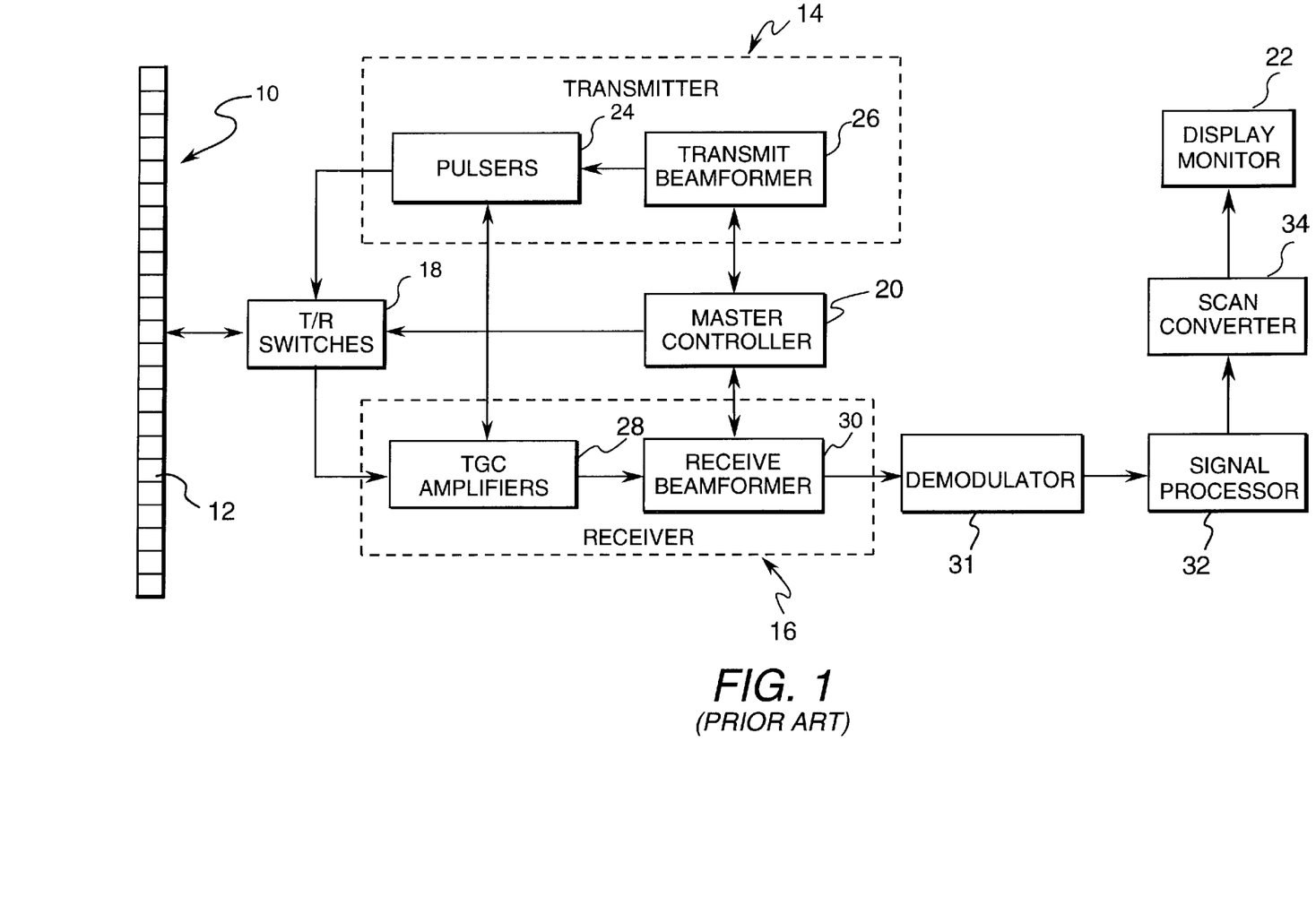
FIG. 1 is a block diagram of an ultrasound imaging system which can be programmed to incorporate the present invention.

An ultrasonic imaging system in which the present invention can be incorporated is shown in FIG. 1 as comprising a transducer array 10 having a plurality of separately driven transducer elements 12, each of which produces a burst of ultrasonic energy when energized by a pulsed waveform produced by a transmitter 14. The ultrasonic energy reflected back to transducer array 10 from an object under study is converted to an electrical signal by each receiving transducer element 12 and applied separately to a receiver 16 through a set of transmit/receive (T/R) switches 18. The T/R switches are typically diodes which protect the receive electronics from high voltages generated by the transmit electronics. The transmit signal causes the diodes to shut off or limit the signal to the receiver. Transmitter 14 and receiver 16 are operated under control of a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display monitor 22.

Under direction of master controller 20, transmitter 14 drives transducer array 10 such that the ultrasonic energy is transmitted as a directed focused beam. To accomplish this, respective time delays are imparted to a multiplicity of pulsers 24 by a transmit beamformer 26. Master controller 20 determines the conditions under which the acoustic pulses will be transmitted. With this information, transmit beamformer 26 determines the timing and the amplitudes of each of the transmit pulses to be generated by pulsers 24. The amplitudes of each transmit pulse are generated by an apodization generation circuit (not shown). Pulsers 24 in turn send the transmit pulses to each of the elements of transducer array 10 via T/R switches 18, which protect time-gain compensation (TGC) amplifiers 28 from high voltages which may exist at the transducer array. By appropriately adjusting the transmit focus time delays and the apodization weightings in conventional manner, an ultrasonic beam can be directed and focused to form a transmit beam.

The echo signals produced by each burst of ultrasonic energy reflect from objects located at successive ranges along each transmit beam. The echo signals are sensed separately by each transducer element 12 and a sample of the magnitude of the echo signal at a particular point in time represents the amount of reflection occurring at a specific range. Due to differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. The amount of amplification provided by the TGC amplifiers is controlled through a control line (not shown). The amplified echo signals are fed to a receive beamformer 30. Each receiver channel of the receive beamformer is coupled to a respective one of transducer elements 12 by a respective one of TGC amplifiers 28.

Under direction of master controller 20, receive beamformer 30 tracks the direction of the transmitted beam, sampling the echo signals at a succession of ranges along each beam. The receive beamformer imparts the proper time delays and receive apodization weightings to each amplified echo signal and sums the signals to provide a composite echo signal which accurately represents the total ultrasonic energy reflected from a point located at a particular range along one ultrasonic beam. The receive focus time delays are computed in real-time using specialized hardware or are read from a lookup table. The receive channels also have circuitry for filtering the received pulses before they are summed by the receive beamformer.

In the system shown in FIG. 1, the frequency of the beamformer output signal is shifted to baseband by a demodulator 31. One way of achieving this is to multiply the input signal by a complex sinusoidal $e^{i2\pi f_d t}$, where $f_d$ is the frequency shift required to bring the signal spectrum to baseband. The demodulated signals are supplied to a signal processor 32 which converts the demodulated signals to display data. In the B-mode (gray-scale), this is the envelope of the signal with some additional processing, such as edge enhancement and logarithmic compression. A scan converter 34 receives the display data from signal processor 32 and converts the data into the desired image for display. In particular, scan converter 34 converts the acoustic image data from polar coordinate (R-θ) sector format or Cartesian coordinate linear array to appropriately scaled Cartesian coordinate display pixel data at the video rate. The scan-converted acoustic data are then provided for display on display monitor 22, which images the time-varying amplitude of the envelope of the B-mode signal as a gray scale. A respective scan line is displayed for each transmit beam.

Figure 2:
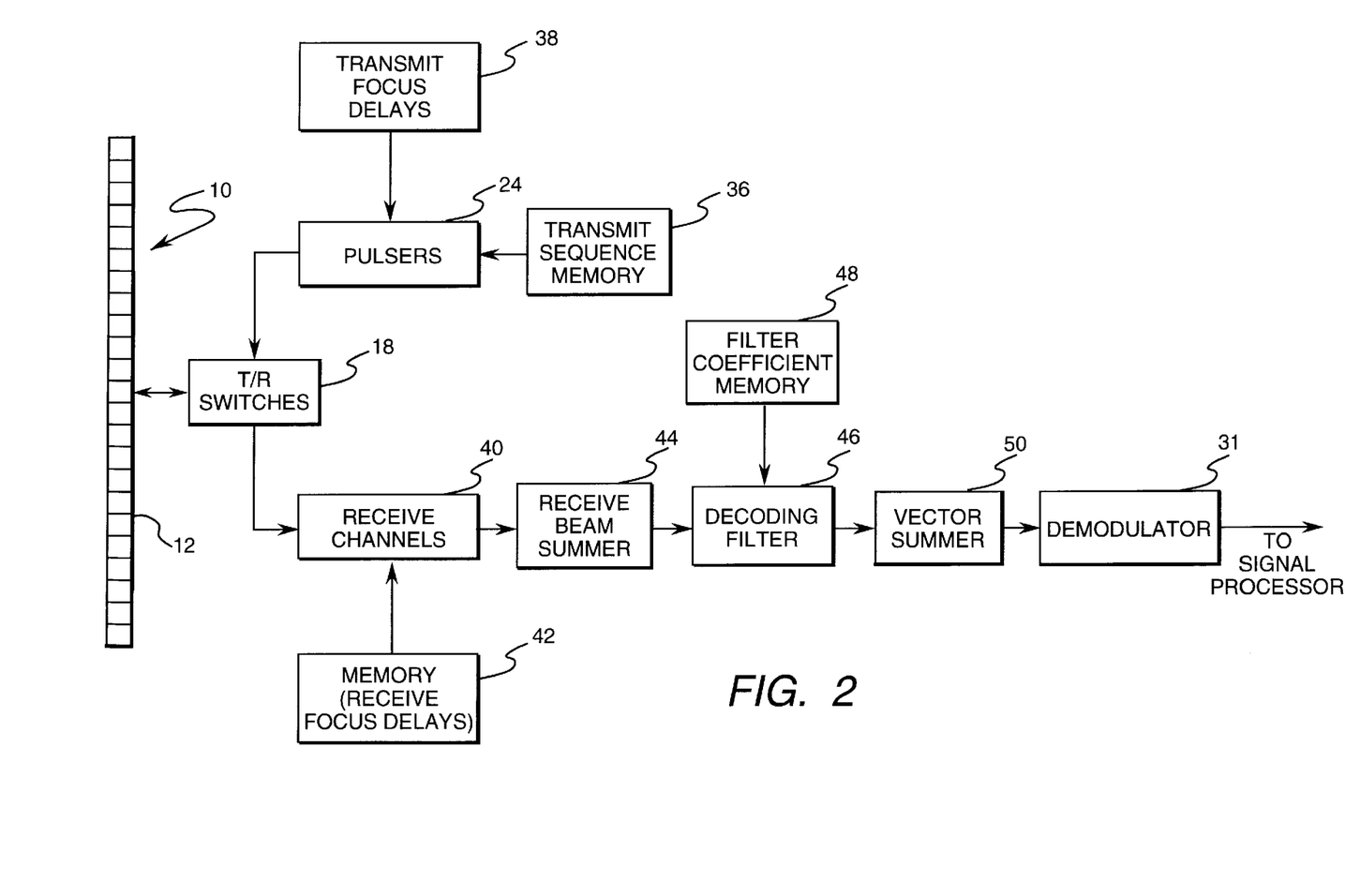
FIG. 2 is a block diagram of an ultrasound imaging system of the type disclosed in U.S. patent application Ser. No. 09/063,109.

In the system of FIG. 2, each transducer element in the transmit aperture is pulsed using a coded sequence of a base sequence, each pulse in the sequence being commonly referred to as a chip. The base sequence is phase encoded, using N-digit transmit codes, to create N-chip coded sequences which are stored in a transmit sequence memory 36. Each coded sequence read out of transmit sequence memory 36 controls activation of a multiplicity of pursers 24 during a respective transmit firing. For example, the transducer elements are pulsed in accordance with a first coded sequence during a first transmit firing focused at a desired transmit focal position and, in accordance with a second coded sequence during a second transmit firing, focused at the same transmit focal position. The first and second coded sequences are generated by respectively convolving first and second transmit codes with the base sequence, i.e., by phase encoding the base sequence using the transmit codes. In accordance with a preferred embodiment, the first and second transmit codes are complementary Golay codes, e.g., the Golay code pair [1,1] and [1,−1], and pulsers 24 are bipolar.

Pulsers 24 drive elements 12 of transducer array 10 such that the ultrasonic energy produced is focused in a beam for each transmit firing. To accomplish this, transmit focus time delays 38 are imparted to the respective pulsed waveforms produced by the pulsers. By appropriately adjusting the transmit focus time delays in conventional manner, the ultrasonic beams can be focused at a multiplicity of transmit focal positions to effect a scan in an image plane.

For each transmit, the echo signals from the transducer elements 12 are fed to respective receive channels 40 of the receive beamformer. Each receive channel includes an analog-to-digital converter (not shown). Under direction of master controller 20 (FIG. 1), the receive beamformer tracks the direction of the transmitted beam. A receive beamformer memory 42 imparts the proper receive focus time delays to each received echo signal and sums the echo signals to provide a composite echo signal which accurately represents the total ultrasonic energy reflected from a particular transmit focal position. The time-delayed receive signals are summed in a receive beam summer 44 for each transmit firing.

The summed receive signals from successive firings are supplied to a decoding filter 46 which correlates the first summed receive signal with the first receive code for the first transmit firing and the second summed receive signal with the second receive code for the second transmit firing. The filtered signals derived from the first and second transmit firings focused at the same transmit focal position are summed by a vector summer 50. As used herein, the term "decoder" comprises the decoding filter and the vector summer.

The decoded signal is demodulated and supplied to signal processor 32 (FIG. 1). In the B mode, signal processing includes envelope detection, edge enhancement and logarithmic compression. After signal processing and scan conversion, a scan line is displayed on display monitor 22. This procedure is repeated so that a respective scan line is displayed for each transmit focal position (in the instance of one transmit focal position for each beam angle) or for each vector (in the instance of multiple transmit focal positions for each beam angle).

During each firing, pulsers 24 are excited by a Golay-encoded base sequence supplied from transmit sequence memory 36 or from specialized hardware. In response to the Golay-encoded base sequence from transmit sequence memory 36 and the transmit focus delays from lookup table 38, the pulsers provide Golay-encoded pulse sequences to the respective transducer elements 12 making up the transmit aperture. The +1 and −1 elements of each Golay-encoded base sequence are transformed into pulses of opposite phase by pulsers 24.

The Golay code pair is transmitted not directly but by first oversampling (typically at 40 MHz or dt=0.025 microsecond time samples) the sequences and then convolving them with a base sequence to form the Golay encoded base sequences. A Golay encoded base sequence can be transmitted much more efficiently than the Golay code sequence itself since its spectrum is better matched to the transducer passband with proper selection of the base sequence.

Figure 3:
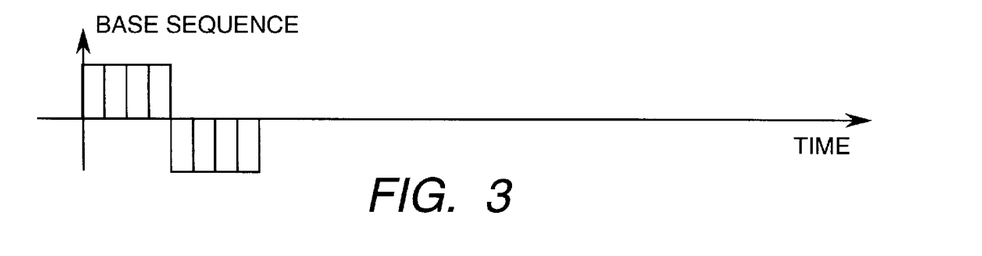
FIGS. 3–5 are pulse diagrams showing a base sequence (FIG. 3), an oversampled Golay code sequence (FIG. 4) and a Golay-encoded base sequence (FIG. 5) in accordance with the teachings of U.S. patent application Ser. No. 09/063,109.
Figure 4:
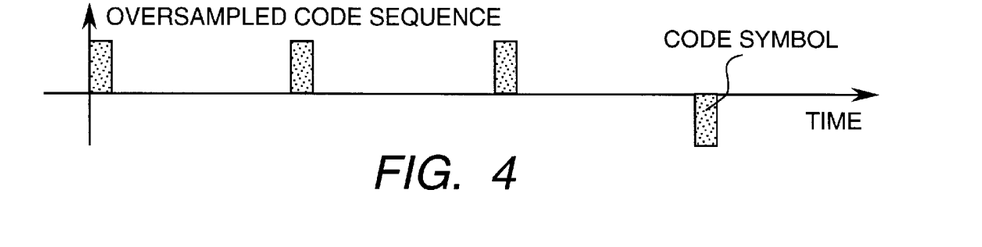
Figure 5:
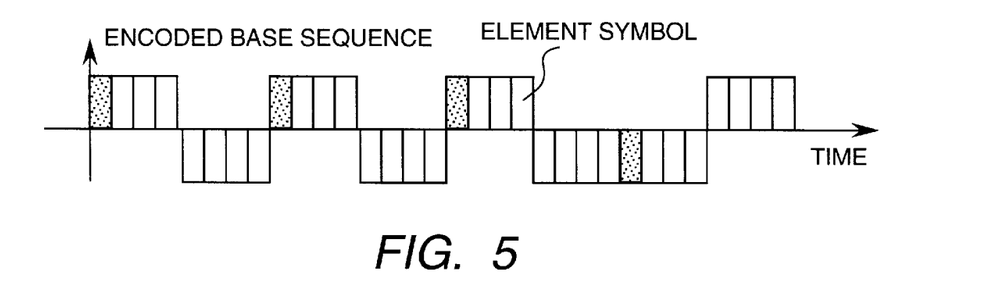

FIGS. 3–5 illustrate formation of a transmit Golay-encoded base sequence from the convolution of a base sequence with one of a pair of oversampled Golay sequences. The base sequence is designed to optimize the resulting ultrasonic pulse shape and spectral energy. In the example depicted in FIG. 3, the base sequence is a sequence of pulses having the following polarities: [+1,+1,+1+1,−1,−1,−1,−1,]. For a first firing the base sequence is convolved with an oversampled Golay sequence (see FIG. 4) corresponding to Golay code [+1,+1,+1,−1]. The resulting Golay-encoded base sequence is shown in FIG. 5. For a second firing, the base sequence is convolved with an oversampled Golay sequence (not shown) corresponding to Golay code [−1,+1,−1,−1]. The Golay-encoded base sequences are pre-computed and stored in the transmit sequence memory. The transmit sequence, after exciting the transducer element, results in a sequence of ultrasonic pulses with polarity given by a Golay sequence for each firing.

Preferably, decoding filter 46, shown in FIG. 2, comprises a finite impulse response (FIR) filter which also performs bandpass filtering, and vector summer 50 comprises a buffer memory having an input coupled to the output of the FIR filter.

For each firing, decode filtering is performed using the oversampled Golay sequences corresponding to the Golay-encoded base sequence employed during transmission. The time-reversed oversampled Golay sequences are stored in a memory 48 and are supplied to decoding filter 46 at the appropriate times. The decoding filter is a finite impulse response filter which performs the correlation:

$$x(n) * \overline{y(-n)} = \sum_m x(m+n)\overline{y(m)} \qquad (1)$$

where * denotes convolution and the overbar denotes conjugation (if x and y are complex). The results of the correlations are summed in vector summer 50 to form the decoded signal, which is then supplied to the demodulator 31.

The imaging system described in U.S. patent application Ser. No. 09/063,109 can also operate by demodulating the RF echo signals to baseband and downsampling before or after the beamsum. In this event, the oversampled Golay sequences that are stored for correlation are also demodulated to baseband and downsampled.

Figure 10:
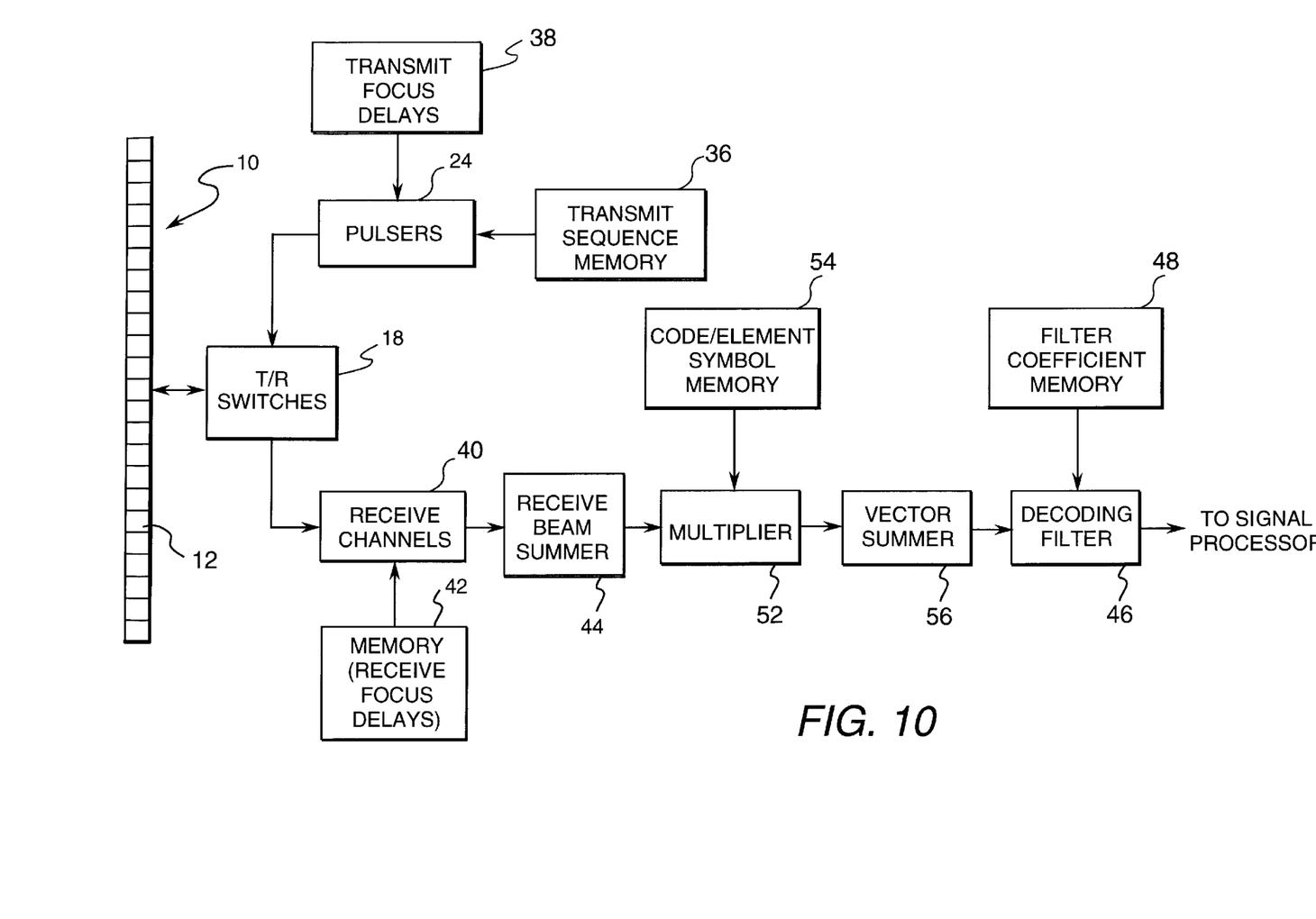
FIG. 10 is a block diagram of the front end of an ultrasonic imaging system in accordance with preferred embodiments of the invention that synthesize either complementary transmit codes (e.g., Golay codes) or so-called single-transmit codes (e.g., Barker codes).

FIG. 10 is a block diagram applicable to embodiments of the invention which synthesize complementary transmit codes (e.g., Golay codes) and which use either unipolar or bipolar pulsers. FIG. 10 also applies to embodiments which synthesize single-transmit codes (e.g., Barker codes) and which use either unipolar or bipolar pulsers. However, for complementary transmit codes, the output signal of decoding filter 46 is sent to a vector summer 50 (FIG. 2) whereas, for single-transmit codes, the output signal of decoding filter 46 is sent directly to demodulator 31 (FIG. 2) without vector summing after passing from the decoding filter. Additionally, the filter coefficients which are provided to the decoding filter differ, depending on the type of transmit code used, as explained in detail below.

Figure 6:
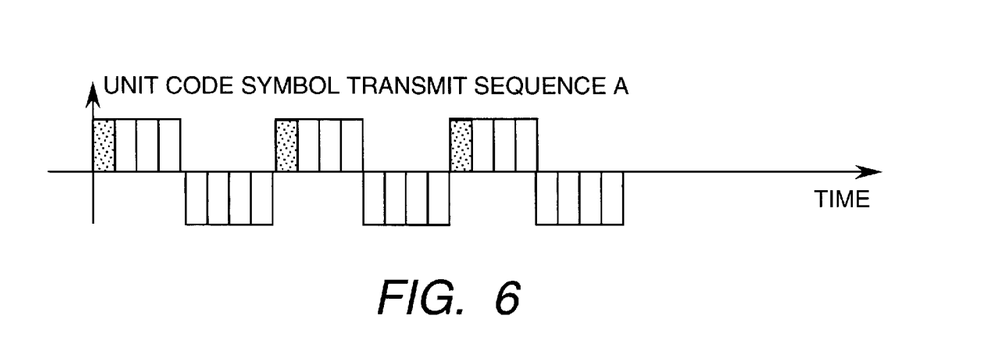
FIGS. 6 and 7 are pulse diagrams showing unit code symbol transmit sequences A and B for use in separate transmit firings in accordance with one preferred embodiment of the invention.
Figure 7:
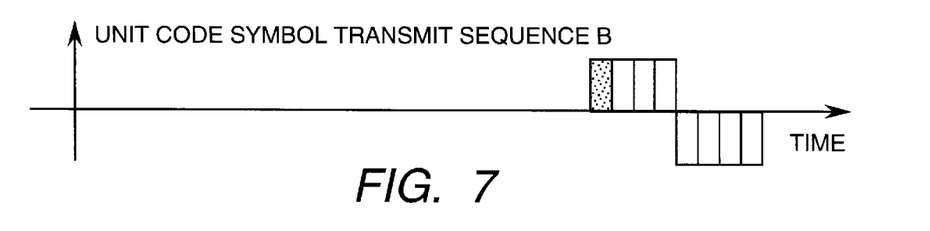

In a preferred embodiment of the invention, complementary code distortion is reduced by transmitting the different code symbols in the encoded base sequence (see FIG. 5) on different firings as illustrated in FIGS. 6 and 7. The transmit sequence A in FIG. 6 corresponds to the code symbol +1, whereas the transmit sequence B in FIG. 7 corresponds to the code symbol −1 such that subtracting the B sequence from the A sequence results in the original encoded base sequence. FIG. 10 shows that this is accomplished by supplying transmit sequences A and B (FIGS. 6 and 7) in succession from the transmit sequence memory. The beamsummed receive signal resulting from the first transmit firing (sequence A) is multiplied in a multiplier 52 by the code symbol +1 retrieved from a code symbol memory 54. This first product signal is provided to a vector summer 56. The beamsummed receive signal resulting from the second transmit firing (sequence B) is then multiplied in multiplier 52 by the code symbol −1 retrieved from code symbol memory 54. This second product signal is also supplied to vector summer 56. The vector summer sums the first and second product signals to synthesize the waveform which, in the absence of code distortion, would have been received following a single transmit firing of a bipolar pulse sequence based on the encoded base sequence shown in FIG. 5. The synthesized receive waveform is sent to decoding filter 46, shown in FIG. 2. This process is repeated to synthesize the receive waveform for the complementary encoded base sequence. The synthesized receive waveforms corresponding to the complementary transmit codes are decoded by decoding filter 46 in combination with vector summer 50. The decoding filter is programmed with respective sets of filter coefficients for the two synthesized receive waveforms. The transmit sequences, code symbols and filter coefficients are supplied by the master controller.

Figure 8:
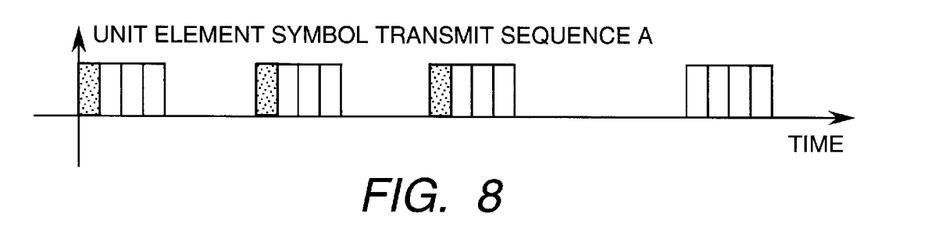
FIGS. 8 and 9 are pulse diagrams showing unit element symbol transmit sequences A and B for use in separate transmit firings in accordance with another preferred embodiment of the invention.
Figure 9:
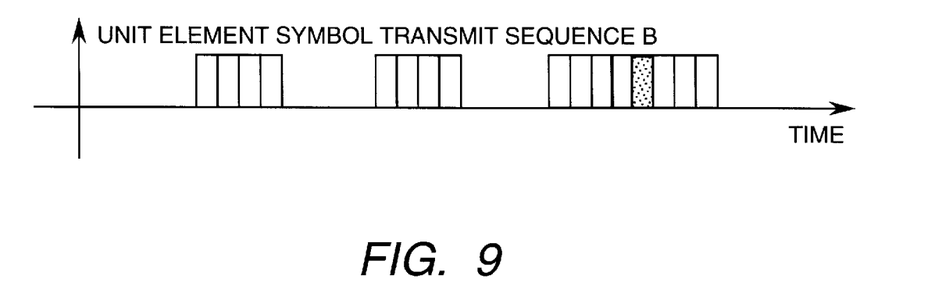

Although the embodiment depicted in FIGS. 6 and 7 is useful for reducing code degradation due to nonlinear propagation, the pulsers must still be bipolar if the base sequence is bipolar. This limitation is removed in another preferred embodiment where the different element symbols in the encoded base sequence are transmitted on different firings as illustrated in FIGS. 8 and 9. The transmit sequence A shown in FIG. 8 corresponds to the +1 element symbol while the transmit sequence B shown in FIG. 9 corresponds to the −1 element symbol such that subtracting the B sequence from the "A" sequence again results in the original encoded base sequence. As indicated in FIG. 10, the transmit sequences A and B shown in FIGS. 8 and 9 are retrieved from transmit sequence memory 36, while the respective elements symbols (e.g., +1 and −10 ) are retrieved from the element symbol memory 54. The receive waveform synthesized by multiplier 52 and vector summer 56 is supplied to decoding filter 46, shown in FIG. 2. This process is repeated to synthesize the receive waveform for the complementary encoded base sequence. The synthesized receive waveforms corresponding to the complementary transmit codes are decoded by decoding filter 46 in combination with vector summer 50. The decoding filter is programmed with respective sets of filter coefficients for the two synthesized receive waveforms. The transmit sequences, element symbols and filter coefficients are supplied by the master controller.

The invention can be extended to bipolar single-transmit codes (e.g., Barker codes). For bipolar single-transmit codes, a specially designed code sequence modulates a transmit burst (base sequence) of length P. A coded pulse sequence of n bursts is often referred to as an n-chip code such that the coded pulse sequence has a total length n ×P. The output signal from the beamformer is compressed in time by passing it through a decoding filter 46 (FIG. 10) which is a finite impulse response filter. Some coded waveforms are best compressed by matched filtering, i.e., using a set of FIR filter coefficients that are an identical copy of the n-chip code. However, sometimes more desirable compression effects are achieved by mismatched filtering using FIR filters that have more than n filter coefficients or have coefficients which differ from the original n-chip code. The output signal of the decoding (i.e., compression) filter is a compressed-pulse signal of length equal or close to the original transmit burst length P, but whose amplitude is that produced by the n-times-longer coded pulse sequence.

In accordance with a preferred embodiment of the invention, two transmit pulse sequences (either unipolar pulses corresponding to transmit sequences of unit element symbols or bipolar pulses corresponding to transmit sequences of unit code symbols) are transmitted in separate firings, instead of transmitting the bipolar pulse sequence of a single-transmit code in one firing. After each transmit, the respective received waveform is multiplied by the respective symbol in multiplier 52, shown in FIG. 10, and accumulated in vector summer 56 to synthesize the waveform which, in the absence of code distortion, would have been received following a single transmit firing of the single-transmit code pulse sequence. For each transmit firing, each transducer element 12 in the transmit aperture is pulsed with a respective pulse sequence (either unipolar or bipolar) by a respective one of pulsers 24. The corresponding transmit sequences are derived from an encoded base sequence formed by convolving a transmit code (e.g., a Barker code) with a base sequence. The coded transmit sequence for controlling the pulses produced by each pulser 24 is stored in transmit sequence memory 36.

The synthesized receive signal produced by vector summer 56, shown in FIG. 10, following the paired transmit firings, is decoded by decoding filter 46. For single-transmit codes, decoding filter 46 produces a compressed pulse. For an n-digit transmit code, decoding filter 46 is preferably an FIR filter having M filter taps (M ≧n) for receiving a set of M filter coefficients from filter coefficient memory 48. The filter coefficients $C_o, C_1, \ldots, C_{M-1}$ have scalar values which, when convolved with the n-digit transmit code, produce a compressed receive pulse sequence.

Figure 11:
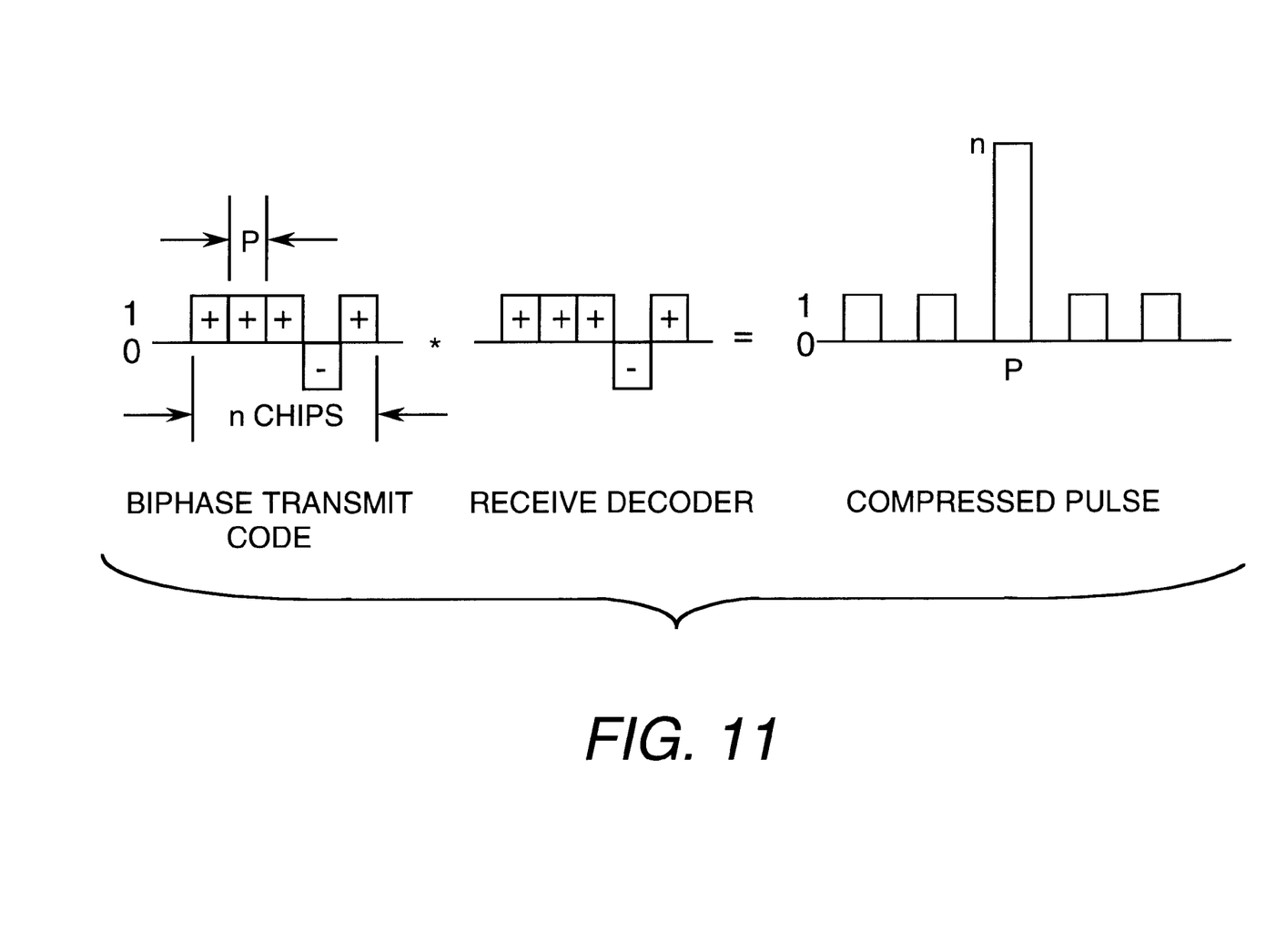
FIG. 11 is an illustration of a compressed pulse being produced by convolution of a 5-bit biphase transmit code with matched filter coefficients of a decoding filter.

As an example, FIG. 11 shows a 5-chip code sequence from the Barker code family. Barker codes are biphase (or binary) code sequences of various lengths up to n=13. (The set of all Barker codes is described by Welch et al. in "Practical Spread Spectrum Pulse Compression For Ultrasonic Tissue Imaging," IEEE Trans Ultrason., Ferroelect., and Freq. Contr., Vol. 45, no. 2, March 1998, pp. 349–355. If the 5-bit Barker code [1,1,1,−1,1] is decoded by a matching FIR filter (i.e., a filter having filter coefficients identical to the digits of the transmit code) as shown in FIG. 11, the compression ratio achieved is n=5, which corresponds to a SNR gain of 7 dB. However, as seen in FIG. 11, the main pulse in the decoder filter output signal is surrounded by pulses of smaller amplitude. These small-amplitude pulses correspond to axial or range sidelobes that are 1/n times lower in amplitude compared to the main lobe.

Among all biphase codes, Barker codes are well known for their property of having the smallest sidelobes possible when decoded by a matched filter. However, for any single transmit code, the sidelobes can often be suppressed via mismatched filtering at the expense of decreased signal gain and/or main lobe broadening (decreased range resolution).

FIG. 10 depicts the invention as comprising means 52, 54 and 56 for synthesizing the waveform which, in the absence of code distortion, would have been received following a single transmit firing of the single-transmit code pulse sequence, and means 46, 48 and 50 (in FIG. 2) for decoding the synthesized receive signal. However, a simplified preferred embodiment of the invention can be achieved by eliminating means 52, 54 and 56, and adapting the decoding stage 46, 48 and 50 to perform both functions. For example, for synthesis of complementary transmit codes, the block diagram of FIG. 2 would hold true. In the latter example, the step of multiplying the receive signals by code/element symbols is incorporated in the decoding stage by storing, in filter coefficient memory, composite filter coefficients formed by multiplying the respective code/element symbols with the respective decoding filter coefficient vectors; and the step of vector summing to form the synthesized receive signal can be combined with the vector summing for decoding by adapting vector summer 50 to sum four vectors instead of two. In this manner, means 46, 48 and 50 in FIG. 2 can be made functionally equivalent to means 46, 48, 50, 52, 54 and 56, all of which, except for vector summer 50 of FIG. 2, are shown in FIG. 10.

Similarly, if a Barker code is used instead of a complementary code, means 52, 54 and 56 can be eliminated by storing composite filter coefficients in memory 48 as previously described and by incorporating a vector summer after the decoding filter 46 and before the demodulator. In this situation, the vector summer need sum only two vectors.

The method employing unit element symbols can be extended to spatially encoded transmits (e.g., using Hadamard codes). In a system employing spatially encoded transmits, M sets of encoded signals are transmitted, one set after the next, from M transmitting elements of a transducer array. For each transmission, all M transmitting elements are activated simultaneously in accordance with the encoding of a particular set. The resulting scattering data are stored for each of the M transmit events. The stored scattering data are subsequently decoded with the inverse of the encoding matrix to obtain individual elemental information.

Figure 12:
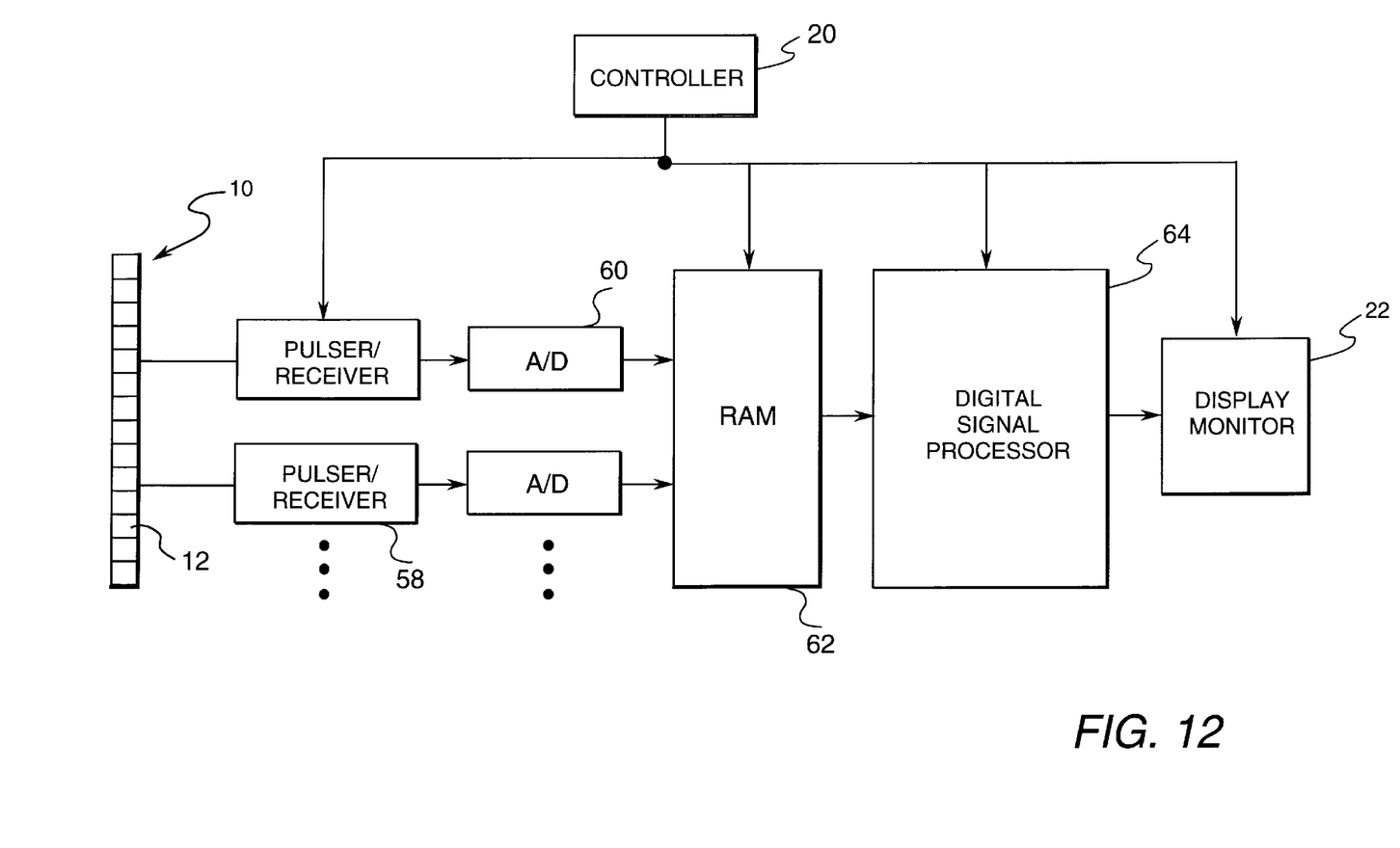
FIG. 12 is a block diagram of a digital ultrasound imaging system in accordance with a preferred embodiment of the invention which synthesizes spatially encoded transmits.

A system of the foregoing type is depicted in FIG. 12. A transducer array 10 is comprised of a plurality of separately driven transducer elements 12, each of which produces a burst of ultrasonic energy when energized by a pulsed waveform produced by a respective pulser/receiver 58. The ultrasonic energy reflected back to transducer array 10 from the object under study is converted to an electrical signal by each receiving transducer element and applied separately to a respective pulser/receiver 58. Pulser/receivers 58 are operated under control of a master controller 20 responsive to commands by a human operator.

Assuming M transmit elements in an array of L $\geq$ M transducer elements, the M elements are simultaneously activated to transmit unfocused ultrasound waves during each one of K=M transmit events. For each transmit event, a different M-element code vector is applied to the pulser/receivers by controller 20 to drive the transmit elements. The M M-element code vectors form the columns of a M×M matrix Q which is invertible. The matrix $Q^{-1}$ has columns $q_1, q_2, \ldots, q_m$.

For each transmit event M, m=1, 2, ... M, the backscattered signal $R_{mn}(t)$, n=1, 2, ..., N, is transduced into electrical signals at a set of N receive elements. These electrical signals are amplified and transmitted by the respective pulser/receivers 58 to respective analog-to-digital converters 60. For each transmit event, the digitized signals are stored in a random access memory (RAM) 62 under the control of controller 20. Upon completion of the K transmit events corresponding to one image frame, the data stored in RAM 62 are retrieved and transformed, i.e., decoded, into another data set $D_{mn}(t)$ by a digital signal processor 64. The digital signal processor also performs beamforming on the decoded image data. The decoded and beamformed image data are displayed on a video monitor 22 as a single image frame. This process is repeated to produce a succession of image frames as the transducer array is scanned over the region or volume of interest.

In accordance with a system employing spatially encoded transmits, the data set $D_{mn}(t)$ is transformed in accordance with the following formula:

$$D_{mn}(t) = \sum_{i=1}^{M} q_m(i) R_{in}(t) \qquad (2)$$

This transformation decodes the set of K transmit events, each of which had transmitted on a group of M=K elements, to obtain a data set where the transmit elements are isolated, i.e., $D_{mn}(t)$ corresponds to the signal received at receive element n from transmit element m. The decoded data set $D_{mn}(t)$ can be beamformed to produce a confocal image.

Although any invertible matrix can be used as the encoding matrix, there are significant benefits to choosing the Hadamard matrix as the encoding matrix. The elements of the Hadamard matrix are either +1 or −1, which can be implemented easily as phase inversion in the transmit electronics. The inverse of a symmetric Hadamard matrix is simply the scaled version of itself $Q_N^{-1}=(1/N)Q$. In general, the decoding process involves the M(M−1) operations (additions and multiplications) on the received data sets. However, for Hadamard encoding, the decoding can be performed in $M\log_2 M$ operations (additions only). Hadamard matrices may be generated by the following recursion:

$$Q_2 = \begin{bmatrix} 1 & 1 \\ 1 & -1 \end{bmatrix} \qquad (3)$$

$$Q_{2M} = \begin{bmatrix} Q_M & Q_M \\ Q_M & -Q_M \end{bmatrix} \qquad (4)$$

where M=2,4, 8,16, ....

The invention can be used with spatially encoded transmits of the foregoing type. In a preferred embodiment, controller 20 in FIG. 12 is programmed to cause a set of unipolar pulsers to transmit two unipolar sets of pulses in separate firings for each row of the encoding matrix. For example, in order to achieve the same effect with unipolar pulsers as that achieved using bipolar pulsers to pulse an array of four elements with the set of element symbols [+1,+1, −1,+1 ] respectively in one firing, the unipolar pulsers are activated two times: in the first unipolar firing, the three elements corresponding to the +1's in the bipolar set of element symbols are pulsed (i.e., [+1,+1,0,+1]); in the second unipolar firing, only the element corresponding to the −1 in the bipolar set of element symbols is pulsed (i.e., [0,0,+1,0]). The receive signals produced by the first and second firings will be multiplied by +1 and −1 respectively and then summed to synthesize the receive signal which would have been produced, assuming no code distortion, using bipolar pulsers to pulse an array of four elements with the set of element symbols [+1,+1,−1,+1] respectively.

In general, the foregoing operations can be performed by digital signal processor 64 of FIG. 12. Based on commands from controller 20, digital signal processor 64 multiplies the respective sets of elemental receive data signals by the respective sets of element symbols and sums the resulting two sets of elemental receive data to synthesize the data set which would have resulted had that row of the original bipolar encoding matrix been transmitted in a single firing using bipolar pursers.

While only certain preferred features of the invention have been illustrated and described, many modifications and changes will occur to those skilled in the art. For instance, the invention is not limited to using biphase codes, single-transmit codes and spatially encoded transmits; polyphase codes can also be used. It is, therefore, to be understood that the appended claims are intended to cover all such modifications and changes as fall within the true spirit of the invention.

What is claimed is:

1. A system for imaging ultrasound scatterers, comprising:
   an ultrasound transducer array including a multiplicity of transducer elements;
   a multiplicity of pursers for respectively pulsing said multiplicity of transducer elements;
   a transmit sequence source for providing first and second transmit sequences to said pulsers during first and second transmit firings, respectively, said first and second transmit firings being focused at a transmit focal position, said first and second transmit sequences having the property that vector summation of said first transmit sequence multiplied by a first code/element symbol and said second transmit sequence multiplied by a second code/element symbol results in a first encoded base sequence;
   a receiver coupled to said transducer array and programmed to receive first and second sets of receive signals from selected transducer elements forming a receive aperture subsequent to said first and second transmit firings, respectively, and to produce first and second beamsummed signals respectively derived from said first and second sets of receive signals;
   a filter programmed with first and second sets of filter coefficients for filtering said first and second beamsummed signals to form first and second filtered signals, respectively, said first set of filter coefficients being derived by multiplying said first code/element symbol by a first set of decoding filter coefficients and said second set of filter coefficients being derived by multiplying said second code/element symbol by said first set of decoding filter coefficients;
   a vector summer for summing at least said first and second filtered signals to form a decoded signal;
   a processor for forming an image signal which is a function of at least said decoded signal; and
   a display monitor for displaying an image having a portion representing said image signal.

2. The system as recited in claim 1, wherein:
   said transmit sequence source is adapted to further provide third and fourth transmit sequences to said pulsers during third and fourth transmit firings, respectively, said third and fourth transmit firings being focused at said transmit focal position, said third and fourth transmit sequences having the property that vector summation of said third transmit sequence multiplied by said first code/element symbol and said fourth transmit sequence multiplied by said second code/element symbol results in a second encoded base sequence, said first and second encoded base sequences being complementary;
   said receiver bring further programmed to receive third and fourth sets of receive signals from said selected transducer elements which form said receive aperture subsequent to said third and fourth transmit firings, respectively, and to provide third and fourth beamsummed signals respectively derived from said third and fourth sets of receive signals;
   said filter being further programmed with third and fourth sets of filter coefficients for filtering said third and fourth beamsummed signals to form third and fourth filtered signals, respectively, said third set of filter coefficients being derived by multiplying said first code/element symbol by a second set of decoding filter coefficients and said fourth set of filter coefficients being derived by multiplying said second code/element symbol by said second set of decoding filter coefficients;
   said vector summer being adapted to sum said first through fourth filtered signals to form said decoded signal.

3. A system for imaging ultrasound scatterers, comprising:
   an ultrasound transducer array including a multiplicity of transducer elements;
   a multiplicity of pulsers for respectively pulsing said multiplicity of transducer elements;
   a transmit sequence source for providing first and second transmit sequences to said pulsers during first and second transmit firings, respectively, said first and second transmit firings being focused at a transmit focal position, said first and second transmit sequences having the property that a Barker code convolved with a base sequence results in an encoded base sequence;
   a receiver coupled to said transducer array and programmed to receive first and second sets of receive signals from selected transducer elements forming a receive aperture subsequent to said first and second transmit firings, respectively, and to produce first and second beamsummed signals respectively derived from said first and second sets of receive signals;
   a multiplier for multiplying each of said first and second beamsummed signals, respectively, by first and second unit code symbols, respectively, to produce first and second multiplication products;
   a vector summer for summing the multiplication products of said multiplier to form a synthesized signal;
   a decoding filter for decoding said synthesized signal to produce at least one compressed pulse;
   a processor for forming an image signal which is a function of said at least one compressed pulse; and
   a display monitor for displaying an image having a portion representing said image signal.

4. A method for imaging ultrasound scatterers, comprising the steps of:
   driving a first set of transducer elements forming a transmit aperture in a transducer array with first and second pulse sequences during first and second transmit firings respectively, said first and second transmit firings being focused at a transmit focal position, said first and second pulse sequences being derived from first and second transmit sequences respectively, said first and second transmit sequences having the property that vector summation of said first transmit sequence multiplied by a first code/element symbol and said second transmit sequence multiplied by a second code/element symbol results in a first encoded base sequence;

receiving first and second sets of receive signals from a second set of transducer elements forming a receive aperture in the transducer array subsequent to said first and second transmit firings respectively;

forming first and second beamsummed signals derived from said first and second sets of receive signals respectively;

filtering said first and second beamsummed signals to form first and second filtered signals, respectively, by applying first and second sets of filter coefficients, respectively, said first set of filter coefficients being derived by multiplying said first code/element symbol by a first set of decoding filter coefficients and said second set of filter coefficients being derived by multiplying said second code/element symbol by said first set of decoding filter coefficients;

summing at least said first and second filtered signals to form a decoded signal;

forming an image signal which is a function of at least said decoded signal; and displaying an image having a portion representing said image signal.

5. The method as recited in claim 4, further comprising the steps of:

driving said first set of transducer elements with third and fourth pulse sequences during third and fourth transmit firings respectively, said third and fourth transmit firings being focused at said transmit focal position, said third and fourth pulse sequences being derived from third and fourth transmit sequences respectively, said third and fourth transmit sequences having the property that vector summation of said third transmit sequence multiplied by said first code/element symbol and said fourth transmit sequence multiplied by said second code/element symbol results in a second encoded base sequence, said first and second encoded base sequences being complementary;

receiving third and fourth sets of receive signals from said second set of transducer elements subsequent to said third and fourth transmit firings respectively;

forming third and fourth beamsummed signals derived from said third and fourth sets of receive signals respectively;

filtering said third and fourth beamsummed signals to form third and fourth filtered signals, respectively, by applying third and fourth sets of filter coefficients, respectively, said third set of filter coefficients being derived by multiplying said first code/element symbol by a second set of decoding filter coefficients and said fourth set of filter coefficients being derived by multiplying said second code/element symbol by said second set of decoding filter coefficients; and summing said first through fourth filtered signals to form said decoded signal.

6. A method for imaging ultrasound scatterers, comprising the steps of:

driving a first set of transducer elements forming a transmit aperture in a transducer array with first and second pulse sequences during first and second transmit firings respectively, said first and second transmit firings being focused at a transmit focal position, said first and second pulse sequences being derived from first and second transmit sequences respectively, said first and second transmit sequences having the property that a Barker code convolved with a base sequence and said second transmit sequence multiplied by a second code/element symbol results in an encoded base sequence;

receiving first and second sets of receive signals from a second set of transducer elements forming a receive aperture in the transducer array subsequent to said first and second transmit firings, respectively;

forming first and second beamsummed signals derived from said first and second sets of receive signals respectively;

multiplying each of said first and second beamsummed signals, respectively, by first and second unit code symbols, respectively, to produce first and second multiplication products;

summing at least said first and second multiplication products to form a synthesized signal;

decoding said synthesized signal to produce at least one compressed pulse;

forming an image signal which is a function of said at least one compressed pulse; and displaying an image having a portion representing said image signal.

7. A system for imaging ultrasound scatterers, comprising:

an ultrasound transducer array including a multiplicity of transducer elements;

a transmitter coupled to said transducer array and programmed to pulse selected transducer elements which form a transmit aperture in response to a first pulse sequence during a first transmit firing and in response to a second pulse sequence during a second transmit firing, said first and second transmit firings being focused at a transmit focal position;

a receiver coupled to said transducer array and programmed to receive first and second sets of receive signals from selected transducer elements which form a receive aperture subsequent to said first and second transmit firings, respectively, and produce first and second beamsummed signals respectively derived from said first and second sets of receive signals;

a synthesizer for subtracting said second beamsummed signal from said first beamsummed signal to form a first synthesized signal;

a subsystem for forming an image signal as a function of at least said first synthesized signal; and a display monitor for displaying an image having a portion representing said image signal.

8. The system as recited in claim 7, further comprising an element symbol memory, wherein said first and second pulse sequences are unipolar, and wherein said synthesizer comprises a multiplier having first and second inputs and an output, and a vector summer having an input coupled to said multiplier output, said first and second multiplier inputs respectively being adapted to receive said first beamsummed signal and a first value from said element symbol memory during a first reception cycle and respectively being further adapted to receive said second beamsummed signal and a second value from said element symbol memory during a second reception cycle, said first and second values being opposite in polarity.

9. The system as recited in claim 7, further comprising a code symbol memory, wherein said first and second pulse sequences are bipolar, and wherein said synthesizer comprises a multiplier having first and second inputs and an output, and a vector summer having an input coupled to said multiplier output, said first and second multiplier inputs respectively being adapted to receive said first beamsummed signal and a first value from said code symbol memory during a first reception cycle and respectively being further adapted to receive said second beamsummed signal and a second value from said code symbol memory during a second reception cycle, said first and second values being opposite in polarity.

10. The system as recited in claim 7, wherein said transmitter is further programmed to pulse said selected transducer elements which form said transmit aperture with a third pulse sequence during a third transmit firing and with a fourth pulse sequence during a fourth transmit firing, said third and fourth transmit firings being focused at said transmit focal position, said receiver being further programmed to receive third and fourth sets of signals from said selected transducer elements which form said receive aperture subsequent to said third and fourth transmit firings, respectively, and produce third and fourth beamsummed signals respectively derived from said third and fourth sets of signals, said synthesizer being adapted to subtract said fourth beamsummed signal from said third beamsummed signal to form a second synthesized signal, and said image signal formed by said subsystem being a function of said first and second synthesized signals.

11. The system as recited in claim 10, wherein a first summation of said first pulse sequence and a phase inversion of said second pulse sequence substantially equals a first encoded base sequence formed by convolution of a base sequence with a first transmit code, and a second summation of said third pulse sequence and phase inversion of said fourth pulse sequence substantially equals a second encoded base sequence formed by convolution of said base sequence with a second transmit code, said first and second transmit codes being complementary, said subsystem comprising a decoding filter programmed with first and second sets of filter coefficients for filtering said first and second synthesized signals respectively, said first and second sets of filter coefficients being respective functions of said first and second transmit codes respectively.

12. The system as recited in claim 7, wherein said subsystem comprises a decoding filter programmed with a set of filter coefficients for filtering said first synthesized signal to form a compressed-pulse signal.

13. A system for imaging ultrasound scatterers, comprising:
an ultrasound transducer array including a multiplicity of transducer elements;
a transmitter coupled to said transducer array and programmed to simultaneously pulse selected transducer elements which form a transmit aperture in response to a first unipolar pulse set during a first transmit firing and a second unipolar pulse set during a second transmit firing;
a receiver coupled to said transducer array and programmed to receive first and second sets of receive signals from selected transducer elements which form a receive aperture subsequent to said first and second transmit firings respectively;
a synthesizer for respectively subtracting the receive signals of said second set from the receive signals of said first set to form a set of synthesized signals;
a processor for forming an image signal which is a function of at least said set of synthesized signals; and
a display monitor for displaying an image representing said image signal.

14. The system as recited in claim 13, further comprising an element symbol memory, said synthesizer being adapted to add a first product signal and a second product signal for each transducer element in said receive aperture, said first product signal being the product of a respective receive signal of said first set and a first value from said element symbol memory and said second product signal being the product of a respective receive signal of said second set and a second value from said element symbol memory, said first and second values being opposite in polarity.

15. A method for imaging ultrasound scatterers, comprising the steps of:
driving a first set of transducer elements forming a transmit aperture in a transducer array with first and second pulse sequences during first and second transmit firings respectively, said first and second transmit firings being focused at a transmit focal position;
receiving first and second sets of receive signals from a second set of transducer elements forming a receive aperture in the transducer array subsequent to said first and second transmit firings respectively;
forming first and second beamsummed signals from said first and second sets of receive signals respectively;
subtracting said second beamsummed signal from said first beamsummed signal to form a first synthesized signal;
forming an image signal as a function of at least said first synthesized signal; and
displaying an image having a portion representing said image signal.

16. The method as recited in claim 15, wherein said first and second pulse sequences are respectively derived from first and second transmit sequences, the summation of said first transmit sequence and the phase inversion of said second transmit sequence forming a first encoded base sequence.

17. The method as recited in claim 16, wherein said first and second pulse sequences are respectively derived from first and second transmit sequences, each of said first and second transmit sequences being derived, respectively, from an encoded base sequence formed by convolving a Barker code with a base sequence.

18. The method as recited in claim 15, further comprising the steps of:
driving said first set of transducer elements with third and fourth pulse sequences during third and fourth transmit firings respectively, said third and fourth transmit firings being focused at said transmit focal position;
receiving third and fourth sets of receive signals from said second set of transducer elements subsequent to said third and fourth transmit firings respectively;
forming third and fourth beamsummed signals from said third and fourth sets of receive signals respectively;
subtracting said fourth beamsummed signal from said third beamsummed signal to form a second synthesized signal; and
forming said image signal as a function of said first and second synthesized signals.

19. The method as recited in claim 18, wherein said third and fourth pulse sequences are respectively derived from third and fourth transmit sequences, the summation of said third transmit sequence and the phase inversion of said fourth transmit sequence forming a second encoded base sequence.

20. The method as recited in claim 19, wherein said first, second, third and fourth pulse sequences are respectively derived from first, second, third and fourth transmit sequences, each of said first, second, third and fourth transmit sequences being derived, respectively, from an encoded base sequence formed by convolving first and second complementary codes with a base sequence.

21. The method as recited in claim 19, wherein said first and second complementary codes form a Golay code pair.

22. The method as recited in claim 15, wherein said first and second pulse sequences are unipolar.

23. The method as recited in claim 15, wherein said first and second pulse sequences are bipolar.

24. A method for imaging ultrasound scatterers, comprising the steps of:

driving a first set of transducer elements forming a transmit aperture in a transducer array with first and second unipolar pulse sets during first and second transmit firings respectively, said transducer elements of said first set being driven simultaneously for each of said first and second transmit firings;

receiving first and second sets of receive signals from a second set of transducer elements forming a receive aperture in the transducer array subsequent to said first and second transmit firings respectively;

respectively subtracting the receive signals of said second set from the receive signals of said first set to form a set of synthesized signals;

forming an image signal which is a function of at least said set of synthesized signals; and displaying an image representing said image signal.

25. The method as recited in claim 24, wherein the step of subtracting the receive signals of said second set from the receive signals of said first set comprises the steps of adding a first product signal and a second product signal for each transducer element in said receive aperture, said first product signal being the product of a respective receive signal of said first set and a first value from an element symbol memory and said second product signal being the product of a respective receive signal of said second set and a second value from said element symbol memory, said first and second values being opposite in polarity.

* * * * *